United States Patent
Jung et al.

(10) Patent No.: US 9,279,959 B2
(45) Date of Patent: Mar. 8, 2016

(54) OPTICAL SYSTEM

(71) Applicant: SAMSUNG ELECTRO-MECHANICS CO., LTD., Suwon-Si (KR)

(72) Inventors: Phil Ho Jung, Suwon-Si (KR); Yong Joo Jo, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/454,718

(22) Filed: Aug. 7, 2014

(65) Prior Publication Data

US 2015/0338611 A1    Nov. 26, 2015

(30) Foreign Application Priority Data

May 26, 2014 (KR) .................. 10-2014-0062949

(51) Int. Cl.
*G02B 13/00* (2006.01)
*G02B 9/62* (2006.01)

(52) U.S. Cl.
CPC .............. *G02B 13/0045* (2013.01); *G02B 9/62* (2013.01); *G02B 13/00* (2013.01)

(58) Field of Classification Search
CPC ...... G02B 13/001; G02B 13/005; G02B 3/00; G02B 9/62; G02B 9/64
USPC .................................. 359/713, 755, 756, 767
See application file for complete search history.

(56) References Cited

U.S. PATENT DOCUMENTS

| | | | |
|---|---|---|---|
| 2012/0188654 A1* | 7/2012 | Huang | G02B 9/62 359/713 |
| 2012/0194726 A1* | 8/2012 | Huang | G02B 13/0045 348/340 |
| 2012/0243108 A1* | 9/2012 | Tsai | G02B 13/18 359/713 |
| 2012/0314301 A1* | 12/2012 | Huang | G02B 13/0045 359/713 |
| 2013/0003193 A1* | 1/2013 | Huang | G02B 13/0045 359/713 |
| 2013/0050846 A1* | 2/2013 | Huang | G02B 9/62 359/713 |
| 2014/0071542 A1* | 3/2014 | Jung | G02B 13/0045 359/713 |
| 2014/0071543 A1* | 3/2014 | Shinohara | G02B 13/18 359/713 |
| 2014/0111876 A1* | 4/2014 | Tang et al. | 359/757 |

* cited by examiner

*Primary Examiner* — Bumsuk Won
*Assistant Examiner* — William R Alexander
(74) *Attorney, Agent, or Firm* — NSIP Law

(57) ABSTRACT

An optical system may include: in order from an object side, a first lens having positive refractive power and an object-side surface convex in the object side direction; a second lens having negative refractive power; a third lens having negative refractive power; a fourth lens having positive refractive power and an image-side surface convex in an image side direction; a fifth lens having negative refractive power and an image-side surface convex in the image side direction; and a sixth lens having negative refractive power and an image-side surface concave in the image side direction, such that bright, high resolution images may be implemented.

23 Claims, 8 Drawing Sheets

OPTICAL SYSTEM

CROSS-REFERENCE TO RELATED APPLICATION

This application claims the benefit of Korean Patent Application No. 10-2014-0062949 filed on May 26, 2014, with the Korean Intellectual Property Office, the disclosure of which is incorporated in its entirety herein by reference.

BACKGROUND

The present disclosure relates to an optical system.

Recent mobile communications terminals have been provided with camera devices to allow for video calls and for images to be captured. In addition, as the functionality of camera units included in the mobile communications terminals has gradually increased, camera units for mobile communications terminals have been gradually required to have high resolution and high performance implemented therein.

However, since there is a trend for mobile communications terminals to be miniaturized or lightened, there may be limitations in implementing a camera having such high resolution and high performance.

In order to solve these problems, recently, lenses to be used in such camera units have been formed of plastic, a material lighter than glass, and a lens module has been configured using five or more lenses in order to implement high resolution therein.

SUMMARY

An exemplary embodiment in the present disclosure may provide an optical system having an aberration improvement effect, implementing high resolution, and improving sensitivity of a lens.

According to an exemplary embodiment in the present disclosure, an optical system may include, in order from an object side, a first lens having positive refractive power and an object-side surface convex in the object side direction; a second lens having negative refractive power; a third lens having negative refractive power; a fourth lens having positive refractive power and an image-side surface convex in an image side direction; a fifth lens having negative refractive power and an image-side surface convex in the image side direction; and a sixth lens having negative refractive power and an image-side surface concave in the image side direction, such that bright, high resolution images may be implemented by the optical system.

In the optical system according to an exemplary embodiment of the present disclosure, an aperture stop may be disposed between the first and second lenses, such that sensitivity to a misalignment of optical axes of the lenses may be decreased.

In the optical system according to an exemplary embodiment of the present disclosure, a sag value at an end of an effective aperture of a first surface of the fifth lens may be set to be high, such that high resolution performance may be implemented even at the time of imaging a close object.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
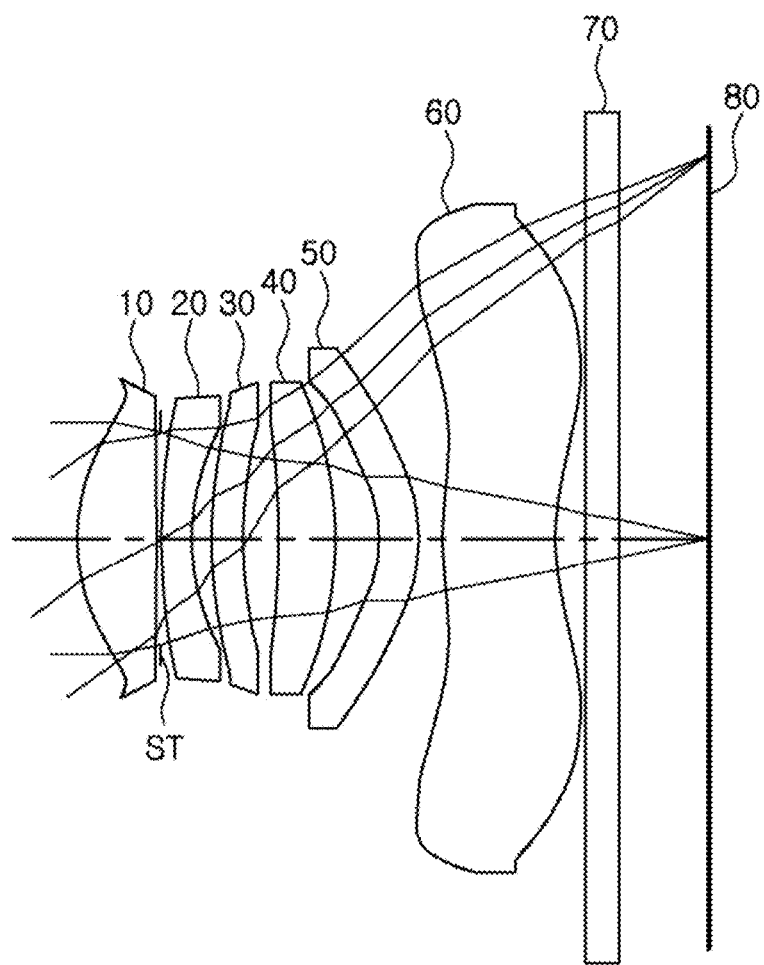
FIG. 1 is a configuration diagram of an optical system according to a first exemplary embodiment in the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In the following lens configuration diagrams, thicknesses, sizes, and shapes of lenses have been slightly exaggerated for explanation. Particularly, shapes of spherical surfaces or aspheric surfaces illustrated in the lens configuration diagrams have been illustrated only by way of example. That is, lenses illustrated in the lens configuration diagrams are not limited to having illustrated surface shapes.

In addition, it is to be noted that a first lens refers to a lens closest to an object side, and a sixth lens refers to a lens closest to an image side.

Further, it is to be noted that the term 'front' refers to a direction from an optical system in the object side direction, while the term 'rear' refers to a direction from the optical system toward an image sensor or the image side. Further, it is to be noted that in each lens, a first surface refers to a surface close to the object side (or an object-side surface) and a second surface of each lens refers to a surface close to the image side (or an image-side surface). In addition, it is to be noted that in the present specification, units of all of numerical values of radii of curvature, thicknesses, OALs, BFLs, and D1 of lenses are mm.

An optical system according to an exemplary embodiment of the present disclosure may include six lenses.

That is, the optical system according to an exemplary embodiment of the present disclosure may include a first lens 10, a second lens 20, a third lens 30, a fourth lens 40, a fifth lens 50, and a sixth lens 60.

However, the optical system according to an exemplary embodiment of the present disclosure is not limited to including only six lenses, but may further include other components if necessary. For example, the optical system may include an aperture stop ST for controlling an amount of light. In addition, the optical system may further include an infrared (IR)

cut-off filter 70 cutting off infrared light. Further, the optical system may further include an image sensor 80 for converting an image of subject incident thereon into an electrical signal. Furthermore, the optical system may further include an interval maintaining member adjusting an interval between the lenses.

The first to sixth lenses 10 to 60 configuring the optical system according to an exemplary embodiment of the present disclosure may be formed of plastic.

In addition, at least one of the first to sixth lenses 10 to 60 may have an aspheric surface. In addition, each of the first to sixth lenses 10 to 60 may have at least one aspheric surface.

That is, at least one of first and second surfaces of the first to sixth lenses 10 to 60 may be aspheric. Here, the aspheric surfaces of the first to sixth lenses 10 to 60 may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In Equation 1, c indicates curvature, k indicates a conic constant, and r indicates a distance from a vertex of an optical axis of each lens to a specific position of the surface of each lens. In addition, constants A to J sequentially indicate 4-th order to 20-th order aspheric coefficients. Further, Z indicates sag in a specific position.

The optical system composed of the first to sixth lenses 10 to 60 may have positive refractive power/negative refractive power/negative refractive power/positive refractive power/negative refractive power/negative refractive power sequentially from the object side.

The optical system configured as described above may improve optical performance through aberration improvement. In addition, the optical system configured as described above may improve sensitivity of the lens by decreasing a refraction angle. Therefore, in the optical system according to an exemplary embodiment of the present disclosure, all of six lenses may be formed of plastic.

The optical system according to an exemplary embodiment of the present disclosure may satisfy Conditional Expression 1.

$0.12 < Th6/f < 0.5$ [Conditional Expression 1]

In Conditional Expression 1, Th6 is a thickness [mm] of the sixth lens in a paraxial region, and f is an overall focal length [mm] of the optical system.

Here, in the case in which the optical system is outside of a lower limit value of Conditional Expression 1, the thickness of the sixth lens in the paraxial region is reduced, such that field curvature may be generated, and it may be difficult to secure resolution performance in a peripheral portion, and in the case in which the optical system is outside of an upper limit value of Conditional Expression 1, the overall focal length of the optical system is decreased, distortion may be increased.

The optical system according to an exemplary embodiment of the present disclosure may satisfy Conditional Expression 2.

$20 < v1 - v3 < 70$ [Conditional Expression 2]

In Conditional Expression 2, v1 is an abbe number of the first lens, and v3 is an abbe number of the third lens.

Here, Conditional Expression 2 may indicate a condition relating to chromatic aberration. In the case in which the optical system is outside of a lower limit value of Conditional Expression 2, it may be difficult to correct the chromatic aberration, such that it may be difficult to implement high resolution, and in the case in which the optical system is outside of an upper limit value of Conditional Expression 2, it may be difficult to decrease manufacturing costs of the third lens.

The optical system according to an exemplary embodiment of the present disclosure may satisfy Conditional Expression 3.

$|Sag9/Th5| > 1.0$ [Conditional Expression 3]

In Conditional Expression 3, Sag9 is a sag value at an end of an effective aperture of an object-side surface of the fifth lens, and Th5 is a thickness [mm] of the fifth lens in the paraxial region.

Here, Conditional Expression 3 indicates a condition relating to resolution at the time of imaging a close object. In the case in which the optical system is outside of a lower limit value of Conditional Expression 3, it may be difficult to correct aberration at the time of imaging a close object, such that it may be difficult to secure high resolution.

The optical system according to an exemplary embodiment of the present disclosure may satisfy Conditional Expression 4.

$f3/f2 > 1.5$ [Conditional Expression 4]

In Conditional Expression 4, f3 is a focal length [mm] of the third lens, and f2 is a focal length [mm] of the second lens.

Here, in the case in which the optical system is outside of a lower limit value of Conditional Expression 4, power of the third lens is increased, and curvature is decreased, such that it may be difficult to manufacture the third lens.

The optical system according to an exemplary embodiment of the present disclosure may satisfy Conditional Expression 5.

$0.5 < OAL/f < 2.0$ [Conditional Expression 5]

In Conditional Expression 5, OAL is a distance [mm] from an object-side surface of the first lens to an image surface, and f is the overall focal length [mm] of the optical system.

Here, in the case in which the optical system is outside of a lower limit value of Conditional Expression 5, a view angle of the optical system may be decreased, and in the case in which the optical system is outside of an upper limit value of Conditional Expression 5, a length of the optical system is increased, such that it may be difficult to miniaturize the optical system.

The optical system according to an exemplary embodiment of the present disclosure may satisfy Conditional Expression 6.

$f5/f1 < -3.0$ [Conditional Expression 6]

In Conditional Expression 6, f5 is a focal length [mm] of the fifth lens, and f1 is a focal length [mm] of the first lens.

Here, in the case in which the optical system is outside of an upper limit value of Conditional Expression 6, negative power of the fifth lens is increased, such that it may be difficult to secure resolution performance at the peripheral portion.

The optical system according to an exemplary embodiment of the present disclosure may satisfy Conditional Expression 7.

$1.60 < n5 < 2.10$ [Conditional Expression 7]

In Conditional Expression 7, n5 is a refractive index of the fifth lens.

Here, in the case in which the optical system is outside of a lower limit value of Conditional Expression 7, it is difficult to correct chromatic aberration, such that it may be difficult to implement high resolution, and in the case in which the optical system is outside of an upper limit value of Conditional Expression 7, it may be difficult to decrease manufacturing costs.

Next, the first to sixth lenses 10 to 60 configuring the optical system according to an exemplary embodiment of the present disclosure will be described.

The first lens 10 may have positive refractive power. In addition, the first lens 10 may have a meniscus shape in which it is convex toward an object side. In detail, first and second surfaces of the first lens 10 may be convex in the object side direction.

In addition, both surfaces of the first lens 10 may be convex. In detail, the first surface of the first lens 10 may be convex in the object side direction, and the second surface thereof may be convex in the image side direction.

At least one of the first and second surfaces of the first lens 10 may be aspheric. For example, both surfaces of the first lens may be aspheric.

The second lens 20 may have negative refractive power. In addition, the second lens 20 may have a meniscus shape in which it is convex in the object side direction. In detail, first and second surfaces of the second lens 20 may be convex in the object side direction.

At least one of the first and second surfaces of the second lens 20 may be aspheric. For example, both surfaces of the second lens 20 may be aspheric.

The third lens 30 may have negative refractive power. In addition, the third lens 30 may have a meniscus shape in which it is convex in the object side direction. In detail, first and second surfaces of the third lens 30 may be convex in the object side direction.

At least one of the first and second surfaces of the third lens 30 may be aspheric. For example, both surfaces of the third lens 30 may be aspheric.

The fourth lens 40 may have positive refractive power. In addition, the fourth lens 40 may have a meniscus shape in which it is convex in an image side direction. In detail, a first surface of the fourth lens 40 may be concave in the object side direction, and a second surface thereof may be convex in the image side direction.

In addition, both surfaces of the fourth lens 40 may be convex. In detail, the first surface of the fourth lens 40 may be convex in the object side direction, and the second surface thereof may be convex in the image side direction.

At least one of the first and second surfaces of the fourth lens 40 may be aspheric. For example, both surfaces of the fourth lens 40 may be aspheric.

The fifth lens 50 may have negative refractive power. In addition, the fifth lens 50 may have a meniscus shape in which it is convex in the image side direction. In detail, a first surface of the fifth lens 50 may be concave in the object side direction, and a second surface thereof may be convex in the image side direction.

At least one of the first and second surfaces of the fifth lens 50 may be aspheric. For example, both surfaces of the fifth lens 50 may be aspheric.

The sixth lens 60 may have negative refractive power. In addition, the sixth lens 60 may have a meniscus shape in which it is convex in the object side direction. In detail, first and second surfaces of the sixth lens 60 may be convex in the object side direction.

In addition, the sixth lens 60 may have an inflection point formed on at least one of the first and second surfaces thereof. For example, the second surface of the sixth lens 60 may be concave in the paraxial region and become convex toward an edge thereof.

Further, at least one of the first and second surfaces of the sixth lens 60 may be aspheric. For example, both surfaces of the sixth lens 60 may be aspheric.

In the optical system configured as described above, a plurality of lenses perform an aberration correction function, whereby aberration improvement performance may be improved. In addition, the optical system may improve sensitivity of the lens by decreasing a refraction angle of the lens. Therefore, in the optical system, all of the lenses may be formed of plastic having optical performance lower than that of glass, whereby manufacturing costs of a lens module may be decreased and manufacturing efficiency thereof may be increased.

An optical system according to a first exemplary embodiment of the present disclosure will be described with reference to FIGS. 1 and 2.

The optical system according to a first exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and an aperture stop ST.

Here, as shown in Table 1, a distance OAL from an object-side surface of the first lens 10 to a first surface (image surface) of the image sensor 80 may be 5.606 mm, and a distance BFL from an image-side surface of the sixth lens 60 to the image surface may be 1.351 mm. In addition, an F-number (FNO) may be 2.2.

Further, a focal length f1 of the first lens 10 may be 3.477 mm, a focal length f2 of the second lens 20 may be −6.265 mm, a focal length f3 of the third lens 30 may be −100 mm, a focal length f4 of the fourth lens 40 may be 6.277 mm, a focal length f5 of the fifth lens 50 may be −29.043 mm, a focal length f6 of the sixth lens 60 may be −11.265 mm, and an overall focal length f of the optical system may be 4.655 mm.

TABLE 1

| | |
|---|---|
| f1 | 3.477 |
| f2 | −6.265 |
| f3 | −100.000 |
| f4 | 6.277 |
| f5 | −29.043 |
| f6 | −11.265 |
| f | 4.655 |
| BFL | 1.351 |
| FNO | 2.2 |
| OAL | 5.606 |
| FOV | 71.9 |

Other characteristics of lenses (radii Ri of curvature of lenses, thicknesses of lenses or distances Thi between lenses, refractive indices Nd of lenses, abbe numbers Vi of lenses) are shown in Table 2.

TABLE 2

| Surface No | Ri | Thi | Nd | Vi |
|---|---|---|---|---|
| 1 | 1.833 | 0.690 | 1.544 | 56.1 |
| 2 | 44.788 | 0.041 | | |
| Stop | Infinity | 0.000 | | |
| 4 | 3.919 | 0.280 | 1.64 | 23.3 |
| 5 | 1.935 | 0.192 | | |
| 6 | 4.107 | 0.280 | 1.64 | 23.3 |
| 7 | 3.759 | 0.300 | | |
| 8 | −150.000 | 0.513 | 1.544 | 56.1 |

TABLE 2-continued

| Surface No | Ri | Thi | Nd | Vi |
|---|---|---|---|---|
| 9 | −3.358 | 0.385 | | |
| 10 | −1.102 | 0.356 | 1.64 | 23.3 |
| 11 | −1.319 | 0.218 | | |
| 12 | 3.192 | 1.000 | 1.535 | 55.7 |
| 13 | 1.861 | 0.268 | | |
| 14 | Infinity | 0.300 | 1.517 | 64.2 |
| 15 | Infinity | 0.782 | | |
| Image | Infinity | | | |

In a first exemplary embodiment of the present disclosure, the first lens 10 may have positive refractive power and a meniscus shape in which it is convex toward an object side. The second lens 20 may have negative refractive power and a meniscus shape in which it is convex in the object side direction. The third lens 30 may have negative refractive power and a meniscus shape in which it is convex in the object side direction. The fourth lens 40 may have positive refractive power and a meniscus shape in which it is convex in an image side direction. The fifth lens 50 may have negative refractive power and a meniscus shape in which it is convex in the image side direction. The sixth lens 60 may have negative refractive power and a meniscus shape in which it is convex in the object side direction. In addition, the sixth lens 60 may have an inflection point formed on at least one of first and second surfaces thereof. Further, the aperture stop ST may be disposed between the first lens 10 and the second lens 20.

The aperture stop ST is disposed between the first lens 10 and the second lens 20, whereby sensitivity to a misalignment of optical axes of each lens may be decreased.

Meanwhile, the respective surfaces of the first to sixth lenses 10 to 60 may have aspheric coefficients as shown in Table 3. That is, all of the first and second surfaces of the first to sixth lenses 10 to 60 may be aspheric.

TABLE 3

2, Aspheric Coefficient
surface#

| | 1 | 2 | 4 | 5 | 6 | 7 |
|---|---|---|---|---|---|---|
| Conic Constant (K) | 0 | 0 | −43.32137 | −1.130722 | 0 | 1.3069067 |
| 4th Order Coefficient (A) | −0.00631 | −0.045566 | 0.0165562 | −0.017122 | −0.057312 | −0.073248 |
| 6th Order Coefficient (B) | 0.0092087 | 0.0768263 | −0.004117 | 0.0415468 | 0.0737331 | 0.0655807 |
| 8th Order Coefficient (C) | −0.025541 | −0.104917 | −0.003306 | −0.029102 | −0.110924 | −0.068876 |
| 10th Order Coefficient (D) | 0.019945 | 0.0793899 | 0.0104331 | 0.0285172 | 0.1042689 | 0.0575375 |
| 12th Order Coefficient (E) | −0.007762 | −0.035208 | −0.004959 | −0.009667 | −0.031911 | −0.012293 |
| 14th Order Coefficient (F) | −0.000528 | 0.0057427 | 0 | 0 | −0.001446 | 0 |

| | 8 | 9 | 10 | 11 | 12 | 13 |
|---|---|---|---|---|---|---|
| Conic Constant (K) | 0 | 0 | −4.50184 | −4.32799 | −17.28129 | −8.24614 |
| 4th Order Coefficient (A) | −0.06209 | −0.00614 | −0.04129 | −0.03879 | −0.0896 | −0.03441 |
| 6th Order Coefficient (B) | 0.009804 | −0.02418 | 0.016529 | 0.006317 | 0.0182 | 0.004803 |
| 8th Order Coefficient (C) | −0.01166 | 0.019357 | −0.01325 | 0.006535 | −0.000163 | −0.00054 |
| 10th Order Coefficient (D) | 0.01409 | −0.00458 | 1.41E-02 | −0.00057 | −2.79E-04 | 2.22E-05 |
| 12th Order Coefficient (E) | 0.004812 | 0.003381 | −0.00608 | −1.01E-03 | 2.14E-05 | 2.86E-07 |
| 14th Order Coefficient (F) | −0.00354 | −0.00141 | 0.000209 | 1.83E-04 | 0 | 0.00E+00 |

Meanwhile, referring to Table 4, it may be appreciated that the optical system according to a first exemplary embodiment of the present disclosure may satisfy the above-mentioned Conditional Expression 1 to 7, and thus, optical performance of the lenses may be improved.

Figure 2:
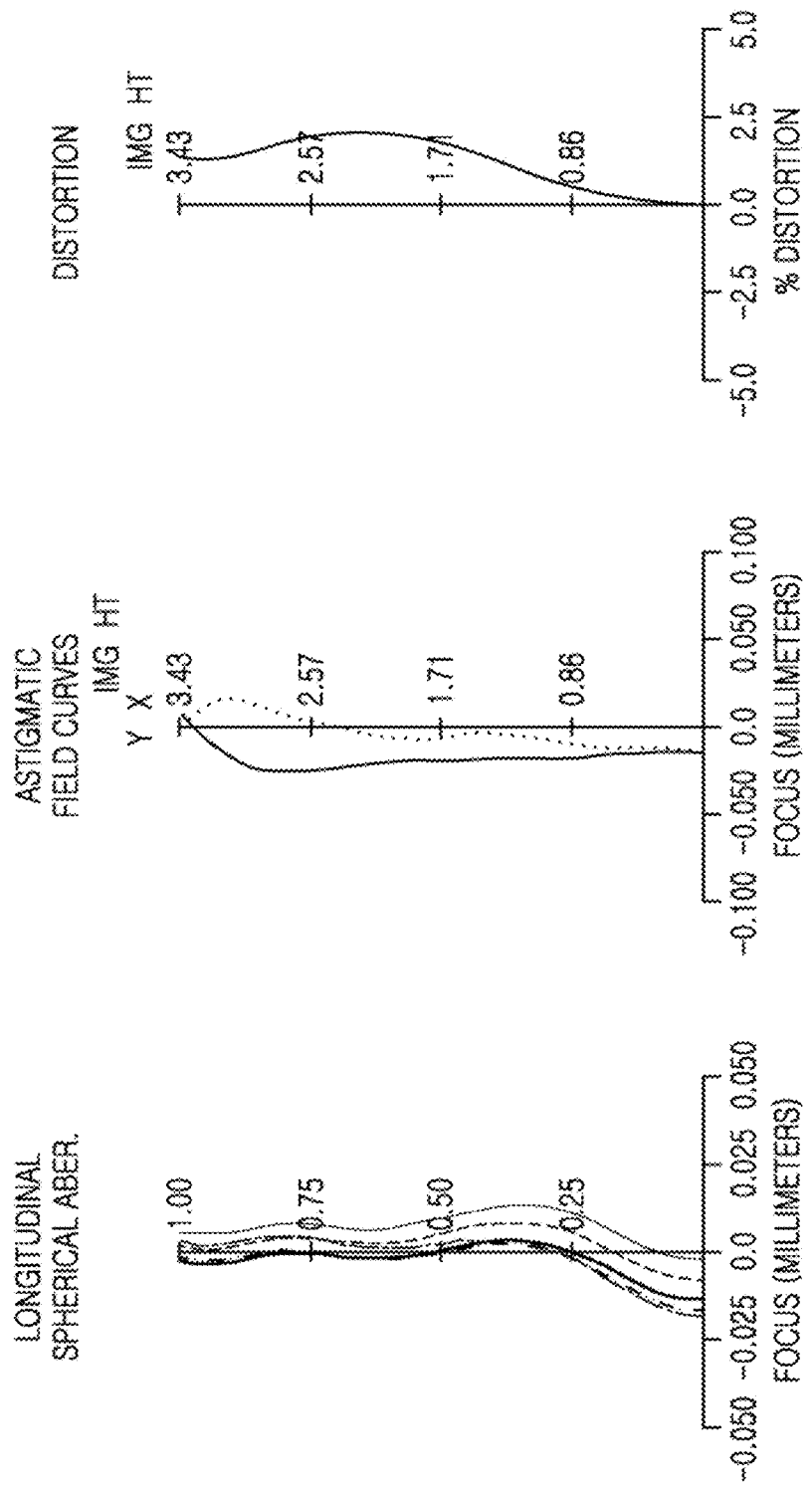
FIG. 2 is a curve showing aberration characteristics of the optical system illustrated in FIG. 1.

Further, the optical system configured as described above may have the aberration characteristics shown in FIG. 2.

TABLE 4

| CONDITIONAL EXPRESSION1 | 0.215 | Th6/f |
| CONDITIONAL EXPRESSION2 | 32.8 | v1 − v3 |
| CONDITIONAL EXPRESSION3 | 1.729 | |sag9/Th5| |
| CONDITIONAL EXPRESSION4 | 15.96213 | f3/f2 |
| CONDITIONAL EXPRESSION5 | 1.2042256 | OAL/f |
| CONDITIONAL EXPRESSION6 | −8.352461 | f5/f1 |
| CONDITIONAL EXPRESSION7 | 1.64 | n5 |

Figure 3:
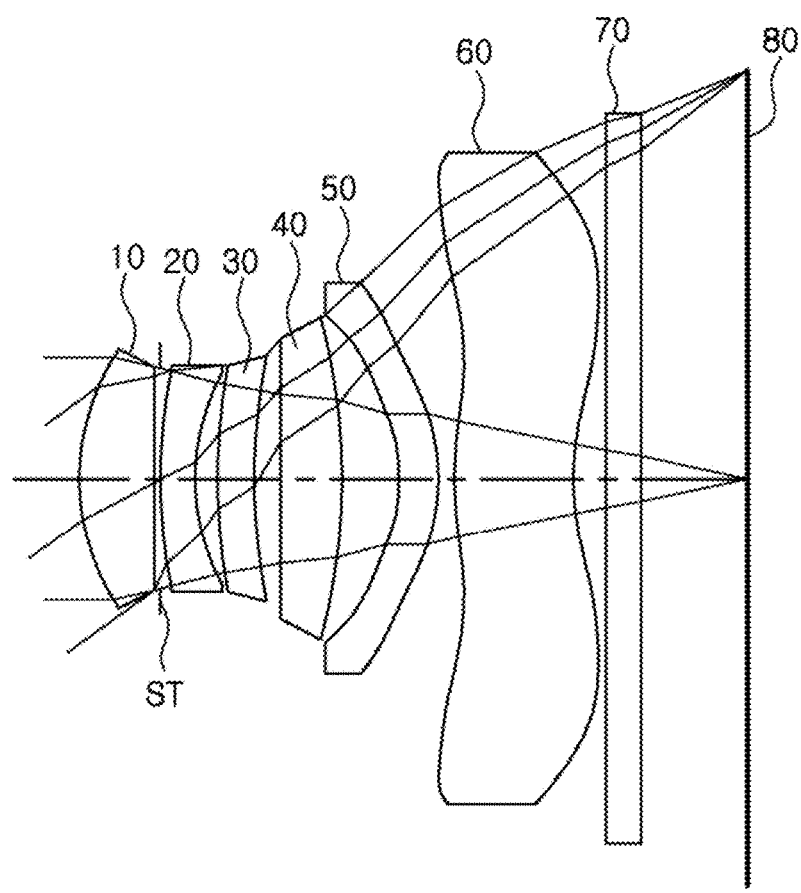
FIG. 3 is a configuration diagram of an optical system according to a second exemplary embodiment in the present disclosure.

An optical system according to a second exemplary embodiment of the present disclosure will be described with reference to FIGS. 3 and 4.

The optical system according to a second exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and an aperture stop ST.

Here, as shown in Table 5, a distance OAL from an object-side surface of the first lens 10 to an image surface of the image sensor 80 may be 5.610 mm, and a distance BFL from an image-side surface of the sixth lens 60 to the image surface may be 1.438 mm. In addition, an FNO may be 2.2.

Further, a focal length f1 of the first lens 10 may be 3.523 mm, a focal length f2 of the second lens 20 may be −5.593 mm, a focal length f3 of the third lens 30 may be −100 mm, a focal length f4 of the fourth lens 40 may be 6.728 mm, a focal length f5 of the fifth lens 50 may be −16.144 mm, a focal length f6 of the sixth lens 60 may be −56.424 mm, and an overall focal length f of the optical system may be 4.65 mm.

TABLE 5

| f1 | 3.523 |
| f2 | −5.593 |
| f3 | −100.000 |
| f4 | 6.728 |
| f5 | −16.144 |

TABLE 5-continued

| f6 | −56.424 |
| f | 4.65 |
| BFL | 1.438 |
| FNO | 2.2 |

TABLE 5-continued

| | |
|---|---|
| OAL | 5.610 |
| FOV | 71.8 |

Other characteristics of lenses (radii Ri of curvature of lenses, thicknesses of lenses or distances Thi between lenses, refractive indices Nd of lenses, abbe numbers Vi of lenses) are shown in Table 6.

TABLE 7

2, Aspheric Coefficient surface#

| | 1 | 2 | 4 | 5 | 6 | 7 |
|---|---|---|---|---|---|---|
| Conic Constant (K) | 0 | 0 | −18.98868 | −2.389671 | 0 | −12.76898 |
| 4th Order Coefficient (A) | −0.003 | −0.043632 | −0.02001 | −0.032692 | −0.053965 | −0.087977 |
| 6th Order Coefficient (B) | 0.0095683 | 0.0847822 | −0.009127 | 0.0330214 | 0.0985976 | 0.1049549 |
| 8th Order Coefficient (C) | −0.026778 | −0.108739 | 0.0074065 | −0.033896 | −0.11346 | −0.078538 |
| 10th Order Coefficient (D) | 0.0228138 | 0.0791382 | 0.0058545 | 0.0244291 | 0.0890554 | 0.0627273 |
| 12th Order Coefficient (E) | −0.008153 | −0.030206 | −0.005929 | −0.016531 | −0.031743 | −0.008708 |
| 14th Order Coefficient (F) | −0.000305 | 0.0031275 | 0 | 0 | 0.0015515 | 0 |
| | 8 | 9 | 10 | 11 | 12 | 13 |
| Conic Constant (K) | 0 | 0 | −5.54977 | −5.0523 | −15.6699 | −8.246137 |
| 4th Order Coefficient (A) | −0.08149 | 0.002704 | −0.03495 | −0.0412 | −0.08562 | −0.038061 |
| 6th Order Coefficient (B) | 0.014707 | −0.0314 | 0.007943 | 0.00775 | 0.018437 | 0.0059149 |
| 8th Order Coefficient (C) | 0.00078 | 0.025632 | −0.01538 | 0.005807 | −0.0003 | −0.00083 |
| 10th Order Coefficient (D) | 0.020227 | −0.0057 | 1.40E−02 | −0.0004 | −2.91E−04 | 5.90E−05 |
| 12th Order Coefficient (E) | −0.0013 | 0.002111 | −0.00506 | −1.02E−03 | 2.39E−05 | −1.36E−06 |
| 14th Order Coefficient (F) | −0.00424 | −0.00107 | −0.0002 | 1.73E−04 | 0 | 0.00E+00 |

TABLE 6

| Surface No | Ri | Thi | Nd | Vi |
|---|---|---|---|---|
| 1 | 1.939 | 0.652 | 1.544 | 56.1 |
| 2 | −235.927 | 0.040 | | |
| Stop | Infinity | 0.000 | | |
| 4 | 2.720 | 0.280 | 1.64 | 23.3 |
| 5 | 1.489 | 0.202 | | |
| 6 | 4.438 | 0.303 | 1.64 | 23.3 |
| 7 | 4.042 | 0.214 | | |
| 8 | 9.733 | 0.523 | 1.544 | 56.1 |
| 9 | −5.797 | 0.491 | | |
| 10 | −1.115 | 0.336 | 1.64 | 23.3 |
| 11 | −1.396 | 0.131 | | |
| 12 | 2.379 | 1.000 | 1.535 | 55.7 |
| 13 | 1.882 | 0.270 | | |
| 14 | Infinity | 0.300 | 1.517 | 64.2 |
| 15 | Infinity | 0.869 | | |
| Image | Infinity | | | |

In a second exemplary embodiment of the present disclosure, the first lens 10 may have positive refractive power, and both surfaces thereof may be convex. The second lens 20 may have negative refractive power and a meniscus shape in which it is convex toward an object side. The third lens 30 may have negative refractive power and a meniscus shape in which it is convex in the object side direction. The fourth lens 40 may have positive refractive power, and both surfaces thereof may be convex. The fifth lens 50 may have negative refractive power and a meniscus shape in which it is convex in an image side direction. The sixth lens 60 may have negative refractive power and a meniscus shape in which it is convex in the object side direction. In addition, the sixth lens 60 may have an inflection point formed on at least one of first and second surfaces thereof. Further, the aperture stop ST may be disposed between the first lens 10 and the second lens 20.

The aperture stop ST is disposed between the first lens 10 and the second lens 20, whereby sensitivity to a misalignment of optical axes of each lens may be decreased.

Meanwhile, the respective surfaces of the first to sixth lenses 10 to 60 may have aspheric coefficients as shown in Table 7. That is, all of the first and second surfaces of the first to sixth lenses 10 to 60 may be aspheric.

Meanwhile, referring to Table 8, it may be appreciated that the optical system according to a second exemplary embodiment of the present disclosure may satisfy the above-mentioned Conditional Expression 1 to 7, and thus, optical performance of the lenses may be improved.

Figure 4:
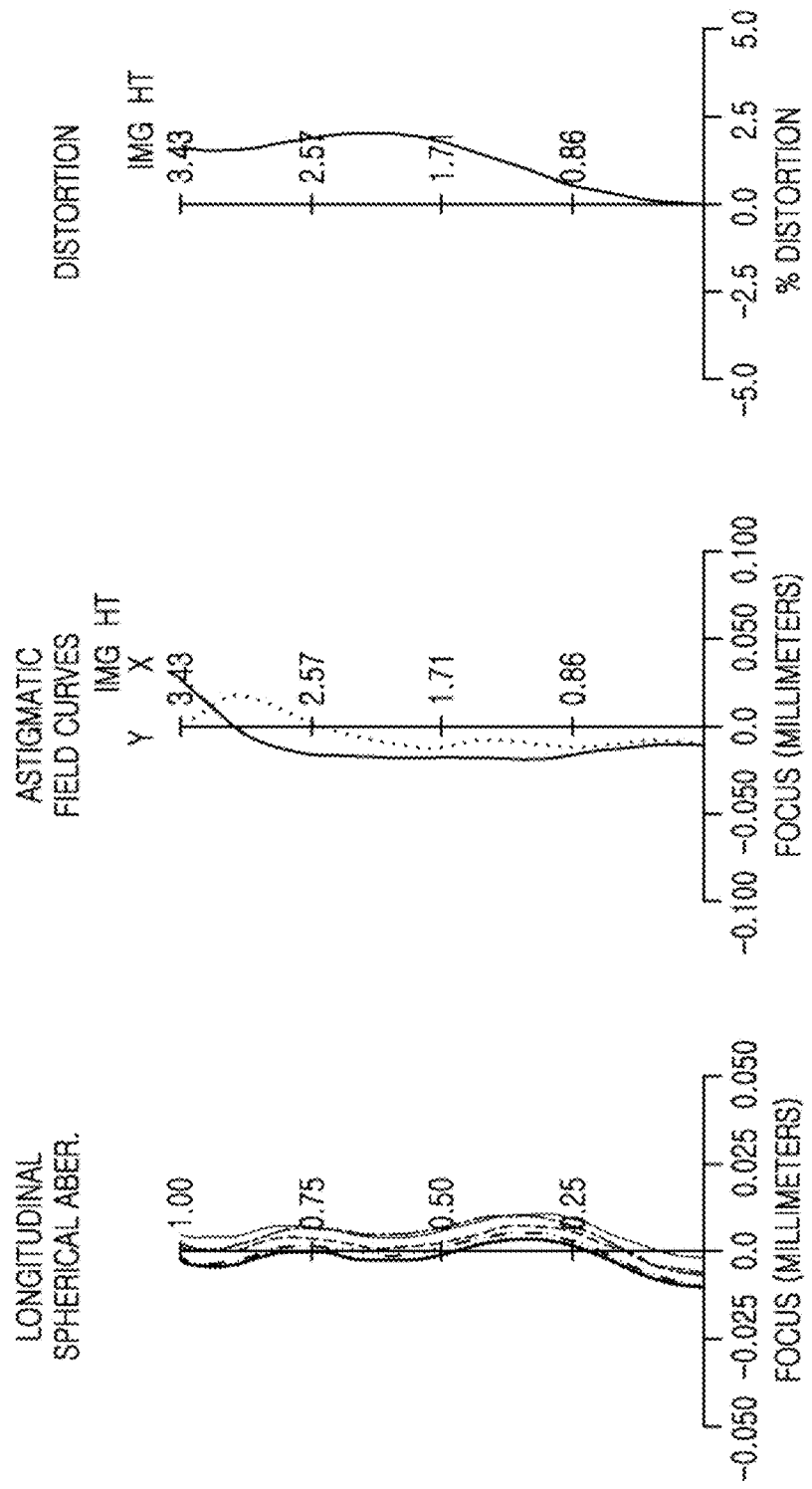
FIG. 4 is a curve showing aberration characteristics of the optical system illustrated in FIG. 3.

Further, the optical system configured as described above may have aberration characteristics shown in FIG. 4.

TABLE 8

| CONDITIONAL EXPRESSION1 | 0.215 | Th6/f |
| CONDITIONAL EXPRESSION2 | 32.8 | v1 − v3 |
| CONDITIONAL EXPRESSION3 | 1.835 | \|sag9/Th5\| |
| CONDITIONAL EXPRESSION4 | 17.88064 | f3/f2 |
| CONDITIONAL EXPRESSION5 | 1.2064149 | OAL/f |
| CONDITIONAL EXPRESSION6 | −4.582963 | f5/f1 |
| CONDITIONAL EXPRESSION7 | 1.64 | n5 |

Figure 5:
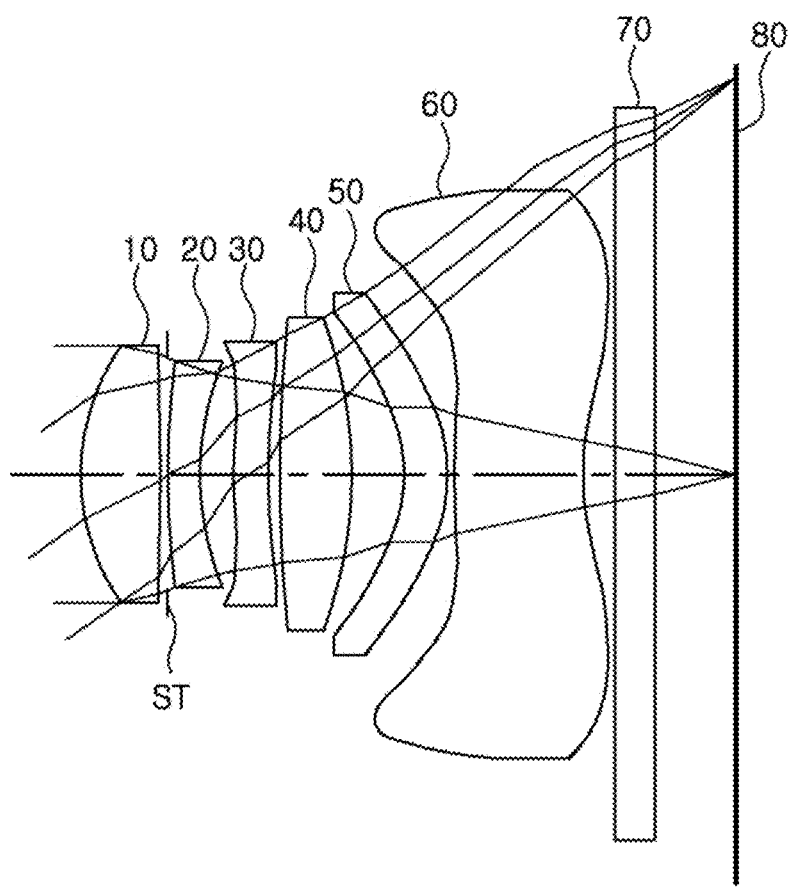
FIG. 5 is a configuration diagram of an optical system according to a third exemplary embodiment in the present disclosure.

An optical system according to a third exemplary embodiment of the present disclosure will be described with reference to FIGS. 5 and 6.

The optical system according to a third exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and an aperture stop ST.

Here, as shown in Table 9, a distance OAL from an object-side surface of the first lens 10 to an image surface of the image sensor 80 may be 4.857 mm, and a distance BFL from an image-side surface of the sixth lens 60 to the image surface may be 1.124 mm. In addition, an FNO may be 2.0.

Further, a focal length f1 of the first lens 10 may be 3.094 mm, a focal length f2 of the second lens 20 may be −6.975 mm, a focal length f3 of the third lens 30 may be −11.248 mm, a focal length f4 of the fourth lens 40 may be 4.286 mm, a focal length f5 of the fifth lens 50 may be −119.767 mm, a focal length f6 of the sixth lens 60 may be −6.893 mm, and an overall focal length f of the optical system may be 3.962 mm.

TABLE 9

| | |
|---|---|
| f1 | 3.094 |
| f2 | −6.975 |
| f3 | −11.248 |
| f4 | 4.286 |
| f5 | −119.767 |
| f6 | −6.893 |
| f | 3.962 |
| BFL | 1.124 |
| FNO | 2 |
| OAL | 4.857 |
| FOV | 71.3 |

Other characteristics of lenses (radii Ri of curvature of lenses, thicknesses of lenses or distances Thi between lenses, refractive indices Nd of lenses, abbe numbers Vi of lenses) are shown in Table 10.

TABLE 10

| Surface No | Ri | Thi | Nd | Vi |
|---|---|---|---|---|
| 1 | 1.543 | 0.597 | 1.544 | 56.1 |
| 2 | 15.211 | 0.052 | | |
| Stop | Infinity | 0.000 | | |
| 4 | 4.448 | 0.250 | 1.635 | 24 |
| 5 | 2.181 | 0.254 | | |
| 6 | 5.161 | 0.250 | 1.635 | 24 |
| 7 | 2.951 | 0.088 | | |
| 8 | 8.618 | 0.535 | 1.544 | 56.1 |
| 9 | −3.146 | 0.381 | | |
| 10 | −0.982 | 0.320 | 1.635 | 24 |
| 11 | −1.121 | 0.050 | | |
| 12 | 3.633 | 0.955 | 1.544 | 56.1 |
| 13 | 1.678 | 0.233 | | |
| 14 | Infinity | 0.300 | 1.517 | 64.2 |
| 15 | Infinity | 0.591 | | |
| Image | Infinity | | | |

In a third exemplary embodiment of the present disclosure, the first lens 10 may have positive refractive power and a meniscus shape in which it is convex toward an object side. The second lens 20 may have negative refractive power and a meniscus shape in which it is convex in the object side direction. The third lens 30 may have negative refractive power and a meniscus shape in which it is convex in the object side direction. The fourth lens 40 may have positive refractive power, and both surfaces thereof may be convex. The fifth lens 50 may have negative refractive power and a meniscus shape in which it is convex in an image side direction. The sixth lens 60 may have negative refractive power and a meniscus shape in which it is convex in the object side direction. In addition, the sixth lens 60 may have an inflection point formed on at least one of first and second surfaces thereof. Further, the aperture stop ST may be disposed between the first lens 10 and the second lens 20.

The aperture stop ST is disposed between the first lens 10 and the second lens 20, whereby sensitivity to a misalignment of optical axes of each lens may be decreased.

Meanwhile, the respective surfaces of the first to sixth lenses 10 to 60 may have aspheric coefficients as shown in Table 11. That is, all of the first and second surfaces of the first to sixth lenses 10 to 60 may be aspheric.

TABLE 11

| 2, Aspheric Coefficient surface# | | | | | | |
|---|---|---|---|---|---|---|
| | 1 | 2 | 4 | 5 | 6 | 7 |
| Conic Constant (K) | 0 | 0 | −94.60379 | −2.48724 | 0 | −6.405423 |
| 4th Order Coefficient (A) | −0.007646 | −0.091959 | 0.0238275 | −0.011157 | −0.194575 | −0.213016 |
| 6th Order Coefficient (B) | 0.01409 | 0.1799862 | 0.0265005 | 0.1465772 | 0.2127484 | 0.2679828 |
| 8th Order Coefficient (C) | −0.072379 | −0.321747 | −0.021934 | −0.168642 | −0.438235 | −0.302319 |
| 10th Order Coefficient (D) | 0.0967402 | 0.2936271 | −0.006203 | 0.0630692 | 0.3242572 | 0.1896666 |
| 12th Order Coefficient (E) | −0.082707 | −0.149657 | 0.0516915 | 0.0502714 | −0.131979 | −0.024877 |
| 14th Order Coefficient (F) | 0.0154043 | 0.0312903 | 0 | 0 | 0.0185318 | 0 |
| | 8 | 9 | 10 | 11 | 12 | 13 |
| Conic Constant (K) | 0 | 0 | −4.39255 | −3.28653 | −50.7508 | −9.54498 |
| 4th Order Coefficient (A) | −0.13005 | −0.02393 | −0.06152 | −0.0272 | −0.14278 | −0.04875 |
| 6th Order Coefficient (B) | 0.085798 | −0.03843 | −0.00911 | −0.02017 | 0.028116 | 0.01032 |
| 8th Order Coefficient (C) | 0.035382 | 0.074886 | −0.00811 | 0.006725 | −0.00421 | −0.00237 |
| 10th Order Coefficient (D) | 0.027825 | −0.02994 | 3.02E−02 | 0.006074 | −8.92E−04 | 2.40E−04 |
| 12th Order Coefficient (E) | −0.06097 | 0.024195 | −0.01212 | −2.57E−03 | 4.74E−04 | −1.20E−05 |
| 14th Order Coefficient (F) | 0.016065 | −0.01368 | 0.000189 | 5.09E−04 | 0 | 0.00E+00 |

Meanwhile, referring to Table 12, it may be appreciated that the optical system according to a third exemplary embodiment of the present disclosure may satisfy the above-mentioned Conditional Expression 1 to 7, and thus, optical performance of the lenses may be improved.

Figure 6:
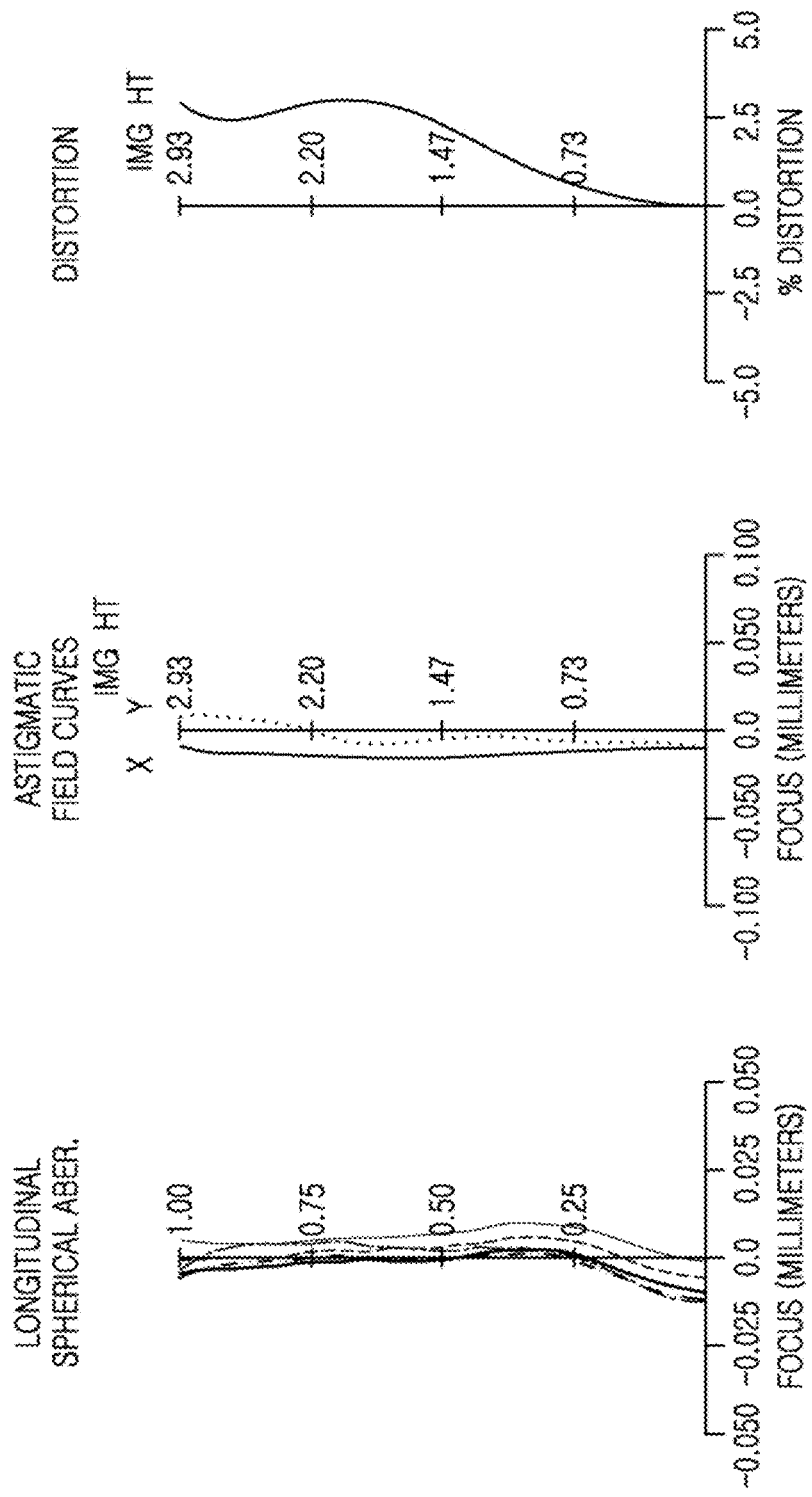
FIG. 6 is a curve showing aberration characteristics of the optical system illustrated in FIG. 5.

Further, the optical system configured as described above may have aberration characteristics shown in FIG. 6.

TABLE 12

| | | |
|---|---|---|
| CONDITIONAL EXPRESSION1 | 0.241 | Th6/f |
| CONDITIONAL EXPRESSION2 | 32.1 | v1 − v3 |
| CONDITIONAL EXPRESSION3 | 1.925 | \|sag9/Th5\| |
| CONDITIONAL EXPRESSION4 | 1.6125633 | f3/f2 |
| CONDITIONAL EXPRESSION5 | 1.2258253 | OAL/f |
| CONDITIONAL EXPRESSION6 | −38.71064 | f5/f1 |
| CONDITIONAL EXPRESSION7 | 1.635 | n5 |

Figure 7:
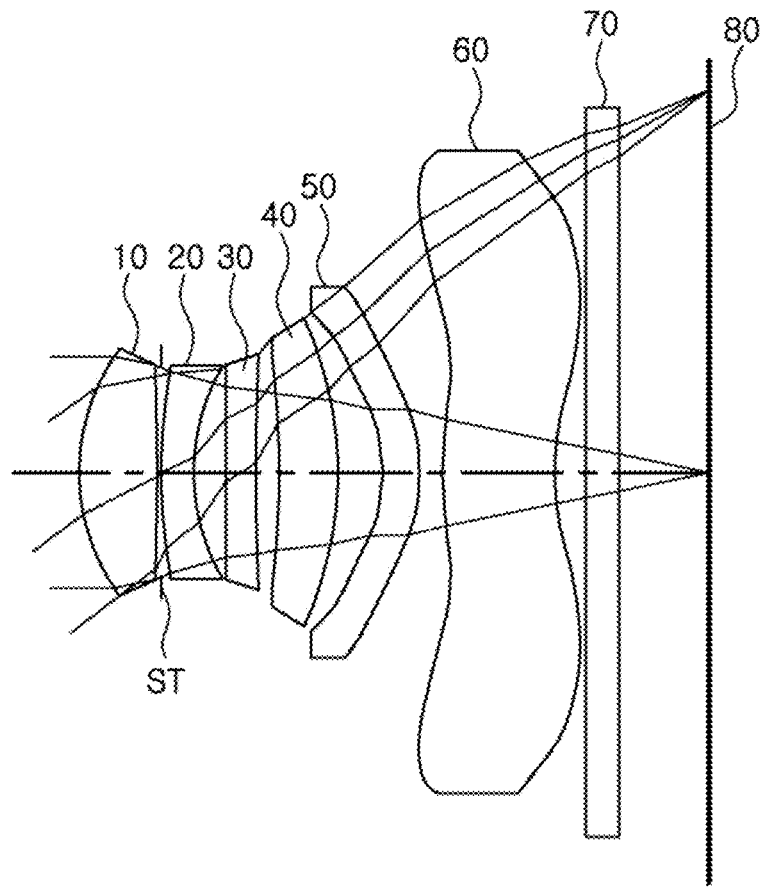
FIG. 7 is a configuration diagram of an optical system according to a fourth exemplary embodiment in the present disclosure.

An optical system according to a fourth exemplary embodiment of the present disclosure will be described with reference to FIGS. 7 and 8.

The optical system according to a fourth exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and an aperture stop ST.

Here, as shown in Table 13, a distance OAL from an object-side surface of the first lens 10 to an image surface of the image sensor 80 may be 5.620 mm, and a distance BFL from an image-side surface of the sixth lens 60 to the image surface may be 1.368 mm. In addition, an FNO may be 2.2.

Further, a focal length f1 of the first lens 10 may be 3.241 mm, a focal length f2 of the second lens 20 may be −5.686 mm, a focal length f3 of the third lens 30 may be −44.607 mm, a focal length f4 of the fourth lens 40 may be 6.763 mm, a focal length f5 of the fifth lens 50 may be −19.275 mm, a focal length f6 of the sixth lens 60 may be −17.418 mm, and an overall focal length f of the optical system may be 4.65 mm.

TABLE 13

| | |
|---|---|
| f1 | 3.241 |
| f2 | −5.686 |
| f3 | −44.607 |
| f4 | 6.763 |
| f5 | −19.275 |
| f6 | −17.418 |
| f | 4.65 |
| BFL | 1.368 |
| FNO | 2.2 |
| OAL | 5.620 |
| FOV | 72 |

Other characteristics of lenses (radii Ri of curvature of lenses, thicknesses of lenses or distances Thi between lenses, refractive indices Nd of lenses, abbe numbers Vi of lenses) are shown in Table 14.

TABLE 14

| Surface No | Ri | Thi | Nd | Vi |
|---|---|---|---|---|
| 1 | 1.794 | 0.699 | 1.544 | 56.1 |
| 2 | −121.240 | 0.040 | | |
| Stop | Infinity | 0.000 | | |
| 4 | 4.256 | 0.295 | 1.64 | 23.3 |
| 5 | 1.918 | 0.273 | | |
| 6 | 13.299 | 0.280 | 1.64 | 23.3 |
| 7 | 9.025 | 0.207 | | |
| 8 | 39.632 | 0.527 | 1.544 | 56.1 |
| 9 | −4.057 | 0.395 | | |
| 10 | −1.108 | 0.332 | 1.64 | 23.3 |
| 11 | −1.359 | 0.203 | | |
| 12 | 2.717 | 1.000 | 1.535 | 55.7 |
| 13 | 1.835 | 0.276 | | |
| 14 | Infinity | 0.300 | 1.517 | 64.2 |
| 15 | Infinity | 0.792 | | |
| Image | Infinity | | | |

In a fourth exemplary embodiment of the present disclosure, the first lens 10 may have positive refractive power, and both surfaces thereof may be convex. The second lens 20 may have negative refractive power and a meniscus shape in which it is convex toward an object side. The third lens 30 may have negative refractive power and a meniscus shape in which it is convex in the object side direction. The fourth lens 40 may have positive refractive power, and both surfaces thereof may be convex. The fifth lens 50 may have negative refractive power and a meniscus shape in which it is convex in an image side direction. The sixth lens 60 may have negative refractive power and a meniscus shape in which it is convex in the object side direction. In addition, the sixth lens 60 may have an inflection point formed on at least one of first and second surfaces thereof. Further, the aperture stop ST may be disposed between the first lens 10 and the second lens 20.

The aperture stop ST is disposed between the first lens 10 and the second lens 20, whereby sensitivity to a misalignment of optical axes of each lens may be decreased.

Meanwhile, the respective surfaces of the first to sixth lenses 10 to 60 may have aspheric constants as shown in Table 15. That is, all of the first and second surfaces of the first to sixth lenses 10 to 60 may be aspheric.

TABLE 15

2, Aspheric Coefficient surface#

| | 1 | 2 | 4 | 5 | 6 | 7 |
|---|---|---|---|---|---|---|
| Conic Constant (K) | 0 | 0 | −61.19369 | −1.897025 | 0 | 1.6902788 |
| 4th Order Coefficient (A) | −0.00453 | −0.016152 | 0.0339733 | −0.019301 | −0.066794 | −0.095432 |
| 6th Order Coefficient (B) | 0.0112789 | 0.0702148 | −0.001339 | 0.0707356 | 0.0788343 | 0.0840904 |
| 8th Order Coefficient (C) | −0.026632 | −0.112037 | −0.011758 | −0.039424 | −0.099791 | −0.074629 |
| 10th Order Coefficient (D) | 0.0208755 | 0.0803906 | 0.0051128 | 0.0096738 | 0.087585 | 0.0592147 |
| 12th Order Coefficient (E) | −0.006557 | −0.02903 | 0.0004664 | 0.0036187 | −0.025764 | −0.009667 |
| 14th Order Coefficient (F) | −0.001211 | 0.0026039 | 0 | 0 | −0.000701 | 0 |

| | 8 | 9 | 10 | 11 | 12 | 13 |
|---|---|---|---|---|---|---|
| Conic Constant (K) | 0 | 0 | −4.8093 | −4.58461 | −15.86686 | −7.60467 |
| 4th Order Coefficient (A) | −0.09058 | −0.0142 | −0.04228 | −0.04457 | −0.089948 | −0.0367 |
| 6th Order Coefficient (B) | 0.021316 | −0.02763 | 0.011198 | 0.009496 | 0.0181961 | 0.005514 |
| 8th Order Coefficient (C) | −0.01762 | 0.021958 | −0.00737 | 0.006389 | −0.000195 | −0.00065 |
| 10th Order Coefficient (D) | 0.018252 | −0.00542 | 1.28E−02 | −0.00051 | −2.72E−04 | 2.96E−05 |
| 12th Order Coefficient (E) | 0.005705 | 0.001585 | −0.00731 | −1.07E−03 | 2.10E−05 | 1.40E−07 |
| 14th Order Coefficient (F) | −0.00448 | −0.00061 | 0.000897 | 1.95E−04 | 0 | 0.00E+00 |

Meanwhile, referring to Table 16, it may be appreciated that the optical system according to a fourth exemplary embodiment of the present disclosure may satisfy the above-mentioned Conditional Expression 1 to 7, and thus, optical performance of the lenses may be improved.

Figure 8:
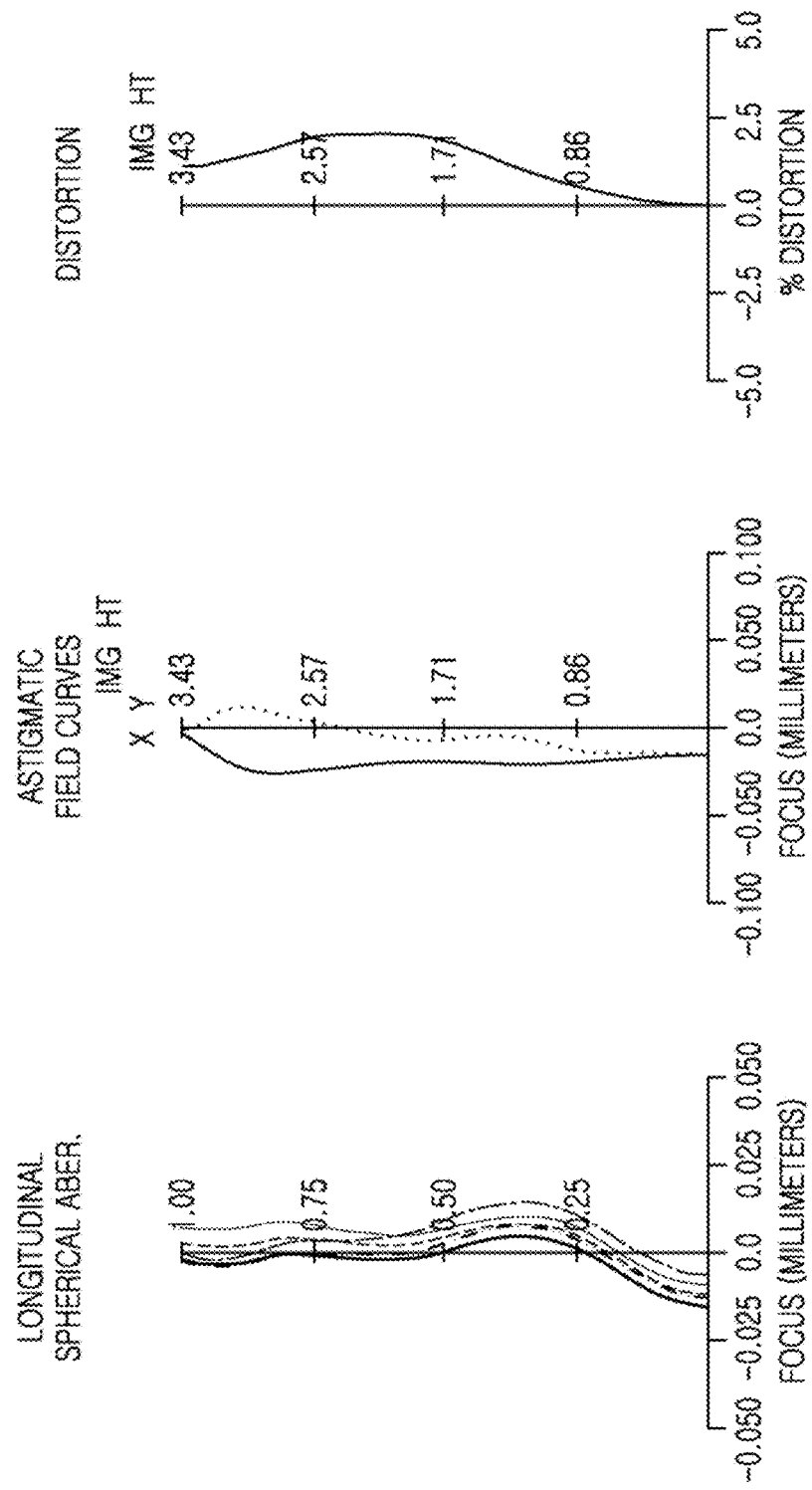
FIG. 8 is a curve showing aberration characteristics of the optical system illustrated in FIG. 7.

Further, the optical system configured as described above may have aberration characteristics shown in FIG. 8.

TABLE 16

| CONDITIONAL EXPRESSION1 | 0.215 | Th6/f |
| CONDITIONAL EXPRESSION2 | 32.8 | v1 − v3 |
| CONDITIONAL EXPRESSION3 | 1.857 | |sag9/Th5| |
| CONDITIONAL EXPRESSION4 | 7.8446229 | f3/f2 |
| CONDITIONAL EXPRESSION5 | 1.2086106 | OAL/f |
| CONDITIONAL EXPRESSION6 | −5.947139 | f5/f1 |
| CONDITIONAL EXPRESSION7 | 1.64 | n5 |

As set forth above, in the optical system according to exemplary embodiments of the present disclosure, the aberration improvement effect may be improved, high resolution may be implemented, and sensitivity to the decenter tolerance of the lens may be decreased.

While exemplary embodiments have been shown and described above, it will be apparent to those skilled in the art that modifications and variations could be made without departing from the spirit and scope of the present disclosure as defined by the appended claims.

What is claimed is:

1. An optical system comprising:
in order from an object side,
a first lens having positive refractive power and an object-side surface convex in the object side direction;
a second lens having negative refractive power;
a third lens having negative refractive power;
a fourth lens having positive refractive power and an image-side surface convex in an image side direction;
a fifth lens having negative refractive power and an image-side surface convex in the image side direction;
a sixth lens having negative refractive power and an image-side surface concave in the image side direction: and
an aperture stop disposed between the first and second lenses.

2. The optical system of claim 1, wherein the first lens has a meniscus shape in which it is convex in the object side direction.

3. The optical system of claim 1, wherein both surfaces of the first lens are convex.

4. The optical system of claim 1, wherein the second lens has a meniscus shape in which it is convex in the object side direction.

5. The optical system of claim 1, wherein the third lens has a meniscus shape in which it is convex in the object side direction.

6. The optical system of claim 1, wherein the fourth lens has a meniscus shape in which it is convex in the image side direction.

7. The optical system of claim 1, wherein the fourth lens has a meniscus shape in which both surfaces thereof are convex.

8. The optical system of claim 1, wherein the fifth lens has a meniscus shape in which it is convex in the image side direction.

9. The optical system of claim 1, wherein the sixth lens has a meniscus shape in which it is convex in the object side direction.

10. The optical system of claim 1, wherein the optical system satisfies the an Expression of $$0.12 < Th6/f < 0.5$$

where Th6 is a thickness of the sixth lens in a paraxial region, and f is an overall focal length of the optical system.

11. An optical system comprising:
in order from an object side,
a first lens having positive refractive power and an object-side surface convex in the object side direction;
a second lens having negative refractive power;
a third lens having negative refractive power;
a fourth lens having positive refractive power and an image-side surface convex in an image side direction;
a fifth lens having negative refractive power and an image-side surface convex in the image side direction;
a sixth lens having negative refractive power and an image-side surface concave in the image side direction;
wherein the optical system satisfies an Expression of $$20 < v1 - v3 < 70$$

where v1 is an abbe number of the first lens, and v3 is an abbe number of the third lens.

12. The optical system of claim 1, wherein the optical system satisfies an Expression of $$|Sag9/Th5| > 1.0$$

where Sag9 is a sag value at an end of an effective aperture of an object-side surface of the fifth lens, and Th5 is a thickness of the fifth lens in a paraxial region.

13. The optical system of claim 1, wherein the optical system satisfies an Expression of $$f3/f2 > 1.5$$

where f3 is a focal length of the third lens, and f2 is a focal length of the second lens.

14. The optical system of claim 1, wherein the optical system satisfies an Expression of $$0.5 < OAL/f < 2.0$$

where OAL is a distance from the object-side surface of the first lens to an image surface, and f is an overall focal length of the optical system.

15. The optical system of claim 1, wherein the optical system satisfies an Expression of $$f5/f1 < -3.0$$

where f5 is a focal length of the fifth lens, and f1 is a focal length of the first lens.

16. The optical system of claim 1, wherein the optical system satisfies an Expression of $$1.60 < n5 < 2.10$$

where n5 is a refractive index of the fifth lens.

17. An optical system comprising:
in order from an object side,
a first lens having positive refractive power and an object-side surface convex in the object side direction;
a second lens having negative refractive power;
a third lens having refractive power;
a fourth lens having positive refractive power and an image-side surface convex in an image side direction;
a fifth lens having negative refractive power and an image-side surface convex in the image side direction; and
a sixth lens having negative refractive power and an image-side surface concave in the image side direction; and an aperture stop disposed between the first and second lenses, wherein the optical system satisfies an Expression of $$0.12 < Th6/f < 0.5$$

where Th6 is a thickness of the sixth lens in a paraxial region, and f is an overall focal length of the optical system.

18. An optical system comprising:

in order from an object side, a first lens having positive refractive power and an object-side surface convex in the object side direction;

a second lens having negative refractive power;

a third lens having negative refractive power;

a fourth lens having positive refractive power and an image-side surface convex in an image side direction;

a fifth lens having negative refractive power and an image-side surface convex in the image side direction; and a sixth lens having negative refractive power and an image-side surface concave in the image side direction, wherein the optical system satisfies an Expression of $$20 < v1 - v3 < 70$$

where v1 is an abbe number of the first lens, and v3 is an abbe number of the third lens.

19. The optical system of claim 17, wherein the optical system satisfies an Expression of $$|Sag9/Th5| > 1.0$$

where Sag9 is a sag value at an end of an effective aperture of an object-side surface of the fifth lens, and Th5 is a thickness of the fifth lens in a paraxial region.

20. The optical system of claim 17, wherein the optical system satisfies an Expression of $$f3/f2 > 1.5$$

where f3 is a focal length of the third lens, and f2 is a focal length of the second lens.

21. The optical system of claim 17, wherein the optical system satisfies an Expression of $$0.5 < OAL/f < 2.0$$

where OAL is a distance from the object-side surface of the first lens to an image surface, and f is the overall focal length of the optical system.

22. The optical system of claim 17, wherein the optical system satisfies an Expression of $$f5/f1 < -3.0$$

where f5 is a focal length of the fifth lens, and f1 is a focal length of the first lens.

23. The optical system of claim 17, wherein the optical system satisfies an Expression of $$1.60 < n5 < 2.10$$

where n5 is a refractive index of the fifth lens.

\* \* \* \* \*